United States Patent [19]

Yamamoto et al.

[11] Patent Number: 4,554,178
[45] Date of Patent: Nov. 19, 1985

[54] METHOD OF INTERNALLY COATING PIPELINE

[75] Inventors: Mitsuo Yamamoto; Namio Kinumoto; Toshinori Tsuji, all of Osaka; Tutomu Hiraoka, Uji, all of Japan

[73] Assignee: Osaka Gas Company, Osaka, Japan

[21] Appl. No.: 644,415

[22] Filed: Aug. 27, 1984

Related U.S. Application Data

[60] Continuation-in-part of Ser. No. 416,188, Sep. 9, 1982, abandoned, which is a division of Ser. No. 304,439, Sep. 21, 1981, abandoned.

[51] Int. Cl.$^4$ .............................................. B05D 7/22
[52] U.S. Cl. .................................... 427/140; 427/142; 427/232; 427/235
[58] Field of Search ............... 427/142, 232, 235, 140

[56] References Cited

U.S. PATENT DOCUMENTS 3,287,148 11/1966 Hilbush .......................... 427/142 X
4,327,132 4/1982 Shinno ................................. 427/235

Primary Examiner—James R. Hoffman
Attorney, Agent, or Firm—Edwin E. Greigg

[57] ABSTRACT

A pipeline needing leakage repair and/or prevention is filled with a liquid sealant in foamed state of the aqueous emulsion type. Then an excess amount of the sealant in the center of the pipeline is drained from the pipeline, and the sealant remaining on the interior wall of the pipeline is allowed to cure wherein the sealant contains fine particles of inorganic oxide weakly adhering to one another into aggregations, said aggregations easily breaking into such fine particles that they can enter and plug fine cavities of the interior of said pipeline.

3 Claims, 12 Drawing Figures

4,554,178

METHOD OF INTERNALLY COATING PIPELINE

RELATED PATENT APPLICATIONS

This invention is a continuation-in-part of application Ser. No. 416,188 filed Sept. 9, 1982, now abandoned, which is a division of application Ser. No. 304,439 filed Sept. 21, 1981, now abandoned.

BACKGROUND OF THE INVENTION (1) Field of the Invention

This invention relates to a method of sealing fine cracks and cavities in a pipeline for distributing gas, water or the like and at the same time internally coating the pipeline, and in particular to a method of internally coating or sealing such a pipeline for fuel gases by using a foamed sealant.

(2) Description of the Prior Art

The method of sealing fine cracks and cavities in a pipeline and at the same time internally coating the pipeline with a foamed sealant is already known and is used when leakage has occurred or is likely to occur in pipelines, particularly those for distributing gas such as fuel gas. The known method comprises the steps of supplying and filling a pipeline with a foamed sealant of the aqueous emulsion type whereby the sealant penetrates the leaking point, passing air through the pipeline to discharge an excess amount of the sealant, the rest of the sealant remaining in tubular form extending axially of the pipeline and adhering to the interior wall thereof, and finally allowing the residual, tubular sealant to cure.

This method is far more efficient than the old method of replacing a leaking pipeline portion or filling the pipeling with a sealant in liquid state. However, it is required today to shorten the time for repair work.

SUMMARY OF THE INVENTION

This invention intends to meet the above-mentioned requirement.

Therefore, the primary object of the invention is to provide a method of internally coating a pipeline for gases which method achieves a drastic shortening of the time necessary for a sealant to cure on the interior wall of the pipeline.

Another object of the invention is to accelerate the curing of the residual sealant by using a liquid sealant of the aqueous emulsion type curable at high rate.

Still another object of the invention is to further accelerate the curing of the residual sealant by, in addition to the use of the speed curable agent, introducing hot air into the pipeline after an excess amount of the sealant has been drained.

A further object of the invention is to provide a method of coating a pipeline which method utilizes a sealant having for the principal ingredient a polymer, preferably an acrylic polymer, which is emulsified and suspended, and for the auxiliary ingredient fine particles of inorganic oxide weakly adhering to one another into aggregations. These aggregated fine particles will, by nature, readily break up under shear and easily enter the fine cracks and cavities in the interior wall of the pipeline. Therefore, the sealant according to this invention is capable of plugging the fine cracks and cavities more completely and quickly than a sealant containing no such fine particles of inorganic oxide.

A still further object of the invention is to provide a method of internally coating the inner surface of a pipeline for gases such as fuel gas, town gas and natural gas and filling leaking cracks from inside of the pipeline comprising the steps of:

disconnecting the pipeline at two different locations, closing both ends of the pipeline, discharging any gases remaining in the pipeline, filling said closed end pipeline with a soluble emulsion type sealant in a foam state by use of inert gas or air, applying a predetermined pressure to the foam-filled pipeline for a predetermined period of time thereby forcing some of said sealant foam into leaking cracks, directing an inert gas or air flow into said foam-filled pipe to drain any excess amount of said sealant from said pipeline thereby forming a tubular form of said sealant adhering to said pipe along its inner wall surface and extending along its length, and allowing said tubular form adhering to the inner surface of said pipeline to cure wherein the sealant contains fine particles of inorganic oxide weakly adhering to one another into aggregations.

The liquid sealant used in the method according to this invention is the aqueous emulsion type having a solids content of about 50–60 percent by weight. Such a sealant is curable at a rate about twice the curing rate of a sealant readily available on the market which has a solids content of about 40 percent, and almost equal to the curing rate of a solution type sealant. This is illustrated in FIG. 1 showing the relationship between the sealant film thickness T (micron) and the curing time S (second), in which a denotes the emulsion type sealant having a solids content of 60 percent which is used in this invention, and b denotes the emulsion type liquid sealant having a solids content of 40 percent which is available on the market.

It is theoretically possible to increase the solids content above 65 percent, but then it will increase the viscosity to excess to render the sealant unfit for practical use. It can therefore be said that the optimal solids content is in the order of 50–65 percent. Howver, this invention is of course not limited to the above range, and the solids content should be adjusted to suit temperature, humidity and other condition.

The principal ingredient may be selected from polymers of ethylene, styrene-butadiene, acrylonitrile-butadiene, methyl methacrylate-butadiene, vinylpyridiene, vinyl chloride, vinyl acetate, vinylidene chloride, etc., or cis 1, 4-polyisoprene, polyurethane, polybutene, and polyacrylate.

Apart from increasing the solids content, part of the water in which the solids are emulsified and suspended may be replaced by a volatile solvent such as methanol in order to increase the curing rate of the emulsion type liquid sealant.

In order to accelerate the sealant into the cracks in the pipeline, it is desirable to discharge any gases remaining in the pipeline prior to the filling of said pipeline with sealant. This step of gas discharging will not only assure the safety during the lining operation but also eliminate an undesirable bad interaction between the sealant and the gases which would otherwise remain within the pipeline. A vacuum pump may be employed for discharging the remaining gas.

According to the invention, the curing of the sealant adhering in tubular form to the interior wall of the pipeline may be more accelerated by introducing hot air into the pipeline in addition to rendering the liquid sealant per se curable at high rate. The hot air heats not only the inner surface of the residual sealant but also its body and outer surface by virtue of heat conduction to positively cause the solvent to evaporate. It is possible in practising the invention to make efficient use of the heat and at the same time avoid sliding or splashing of the residual sealant by passing the hot air at a relatively slow flow rate.

For the purpose of further accelerating the curing process of the sealant, it is useful to decrease the vapor pressure of sealant by evacuating the interior of pipeline after any excess of the sealant has been drained from said pipeline. The vacuum pump described above may be utilized also for this evacuation step. Thus, the invention has shortened the curing time to a satisfactory degree while providing a coating of uniform thickness to enable a reliable repair or prevention of leakage.

It is desirable that the hot air is passed through the pipeline at a temperature of 60-80° C. A temperature above this range may create cracks in the residual sealant, and a temperature therebelow may not warrant the desired shortening of time. However, the invention is not limited to the above temperature range, and hot air in the range of 30-100° C. is effective to the purpose.

The sealant best suited to the method of this invention has for the principal ingredient a polymer, particularly an acrylic polymer, as descrobed, and for the auxiliary ingredient fine particles of inorganic oxide weakly adhering to one another into aggregations. The inorganic oxide may preferably be selected from a group consisting of silica, alumina, silica-alumina, zeolite, titanium oxide, zinc oxide, and magnesium oxide. The polymer content may be at 40 percent by weight or more to achieve the desired object and will produce a still better result at 50-65 percent by weight, as described.

The invention will now be described in greater detail with reference to the drawings showing preferred embodiments.

DETAILED DESCRIPTION OF THE PREFERRED EMBODIMENTS

Figure 1:
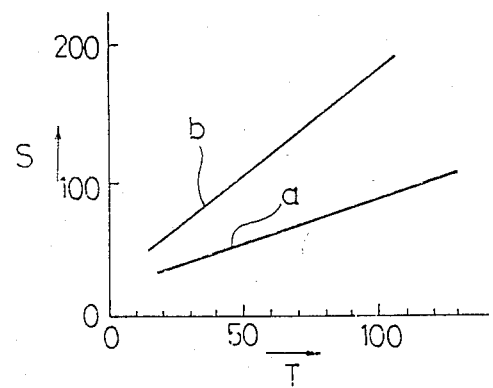
FIG. 1 is a graph showing the relationship between the sealant film thickness and the curing time.
Figure 2:
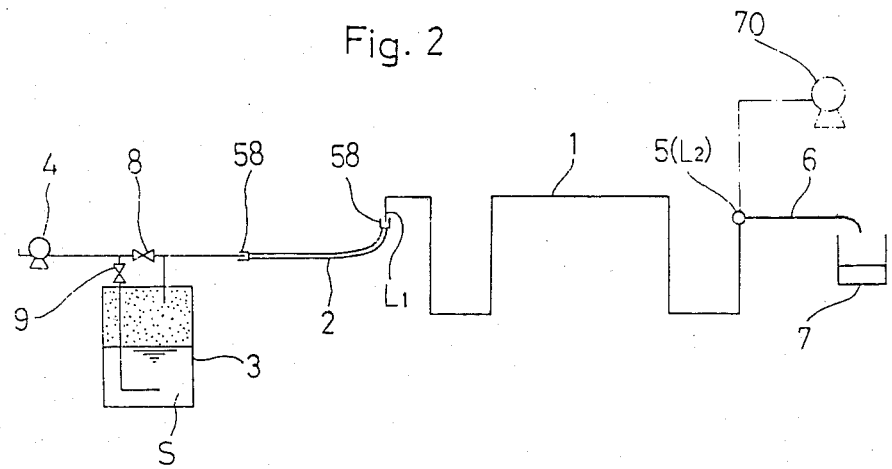
FIG. 2 is a diagram showing a piping system according to one embodiment of the invention.

In the embodiment of FIG. 2, the coating treatment is carried out as described below using the described emulsion type liquid sealant curable at high rate. FIG. 2 shows how devices are connected, in which a foaming device 3 is connected to one end of a pipeline 1 through a connecting tube or pipe 2 and a blower 4 is connected to the foaming device 3. A hose 6 connected to a cock 5 at the other end of the pipeline 1 extends to a recovery vessel 7.

The liquid sealant S stored in the foaming device 3 comprises an emulsion of an acrylic polymer dispersed in water with a solids content of about 60 percent.

Before supplying a sealant to the pipeline 1, this pipeline is at first disconnected from pipe portions (not shown) adjacent thereto at two different locations $L_1$ and $L_2$. Both ends of the pipeline 1 are then closed for discharging any gases such as fuel gas remaining in the pipeline. For this purpose, a vacuum pump 70 is connected to the pipeline for instance at the location $L_2$ and operated for a certain period of time, as shown by a dot-and-dash line in FIG. 2. After the step of gas discharging has finished, the vacuum pump 70 is stopped and disconnected from the pipeline.

Subsequently, the blower 4 is operated with valve 8 closed and a valve 9 open, to foam up the liquid sealant S in the foaming device 3 and feed the foamed sealant into the pipeline 1 by way of the connecting tube 2. The blower 4 is stopped upon arrival of the sealant at the recovery vessel 7, and the pipeline 1 is now filled with the foamed sealant. After a time the blower 4 is operated with the valve 8 open and the valve 9 closed, in order to cause inert gas or air to flow through the pipeline, thus discharging an excess amount of the sealant from the pipeline 1 to be collected at the vessel 7. The sealant remaining in the pipeline 1 assumes a tubular form as at S′ extending axially of the pipeline 1 and adhering to the interior wall thereof as shown in FIG. 3C.

The blower is kept running for a predetermined period of time with the pipeline end closed at the location $L_2$ so as to apply a predetermined pressure to the foam-filled pipeline 1 thereby forcing some of said sealant foam into leaking cracks.

Next, the blower 4 is stopped to allow the residual sealant S′ to cure spontaneously.

Alternately, the blower 4 may be kept running with said end $L_2$ opened again to accelerate the curing by blowing hot dry air at 30-100° C. into the pipeline. Conversely, the pipeline may be closed and then evacuated by the vacuum pump 70 or other means to decrease the vapor pressure thereby accelerating the curing.

Figure 3A:
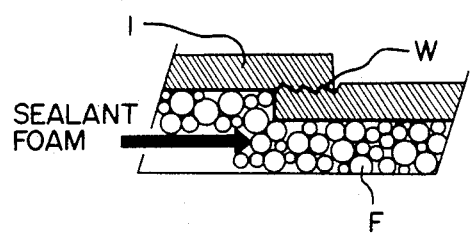
FIGS. 3A, 3B and 3C are sectional diagrams schematically showing an interior coating treatment according to the invention.
Figure 3B:
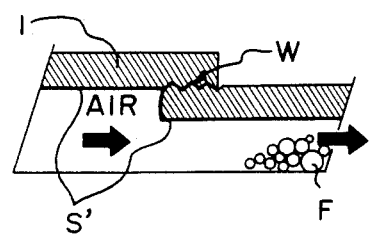
Figure 3C:
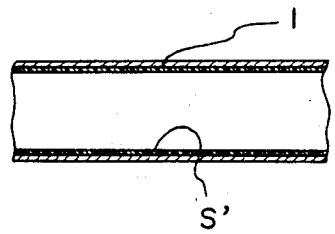

Referring to FIGS. 3A, 3B and 3C illustrating the progress of the above treatment, when the foamed sealant F fills the pipeline (FIG. 3A), it also penetrates the interstice between thread joints W. The sealant remains in the thread joints W and on the interior wall of the pipeline as an excess sealant is removed by air delivered into the pipeline (FIG. 3B). Thus, fine cracks and cavities in both a straight portion (FIG. 3C) and the joint portion are plugged after the sealant cures.

The sealant containing inorganic oxide as described has proved effective to plug the fine cracks and cavities with greater assurance.

The specific constructions and functions of the devices used for carrying out the foregoing treatment are now described with reference to FIGS. 4-7.

Figure 4:
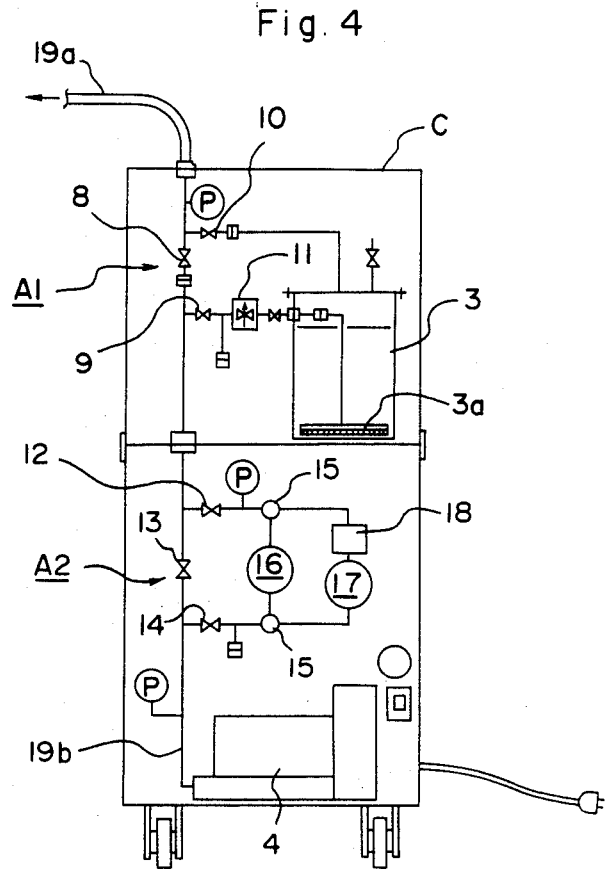
FIG. 4 is a schematic front elevation of a device for foaming up a sealant and feeding it to a pipe interior.

FIG. 4 shows the foaming device 3, the blower 4 and piping A1 and A2 all housed in a boxlike casing C as a unit. The foaming device 3 and the blower 4 may be arranged side by side instead of the illustrated vertical arrangement. The piping A1 includes a valve 10, a constant flow regulator 11 and a bubbling tube 3a in addition to the described valves 8 and 9. The piping A2 includes a valve 12, three-way valves 15, a reducing valve 16 for measuring flow resistance, a reducing valve 17 for testing air-tightness, and a leak tester 18. The reducing valves 15, 16 and the leak tester 18 are dispensable. A feed pipe 19b extending from the blower 4 is connected to a feed pipe 19a for delivering the foamed sealant, and may also branch off outside the casing C.

Figure 5:
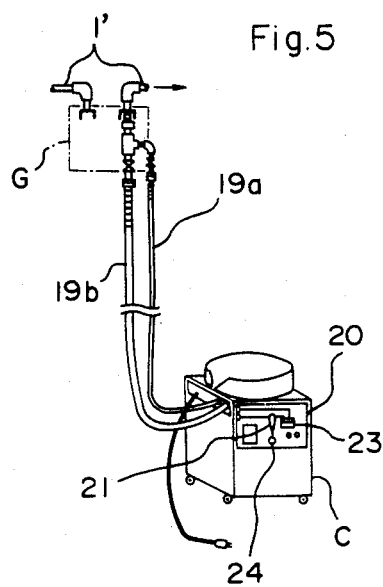
FIG. 5 is a perspective view of the device of FIG. 4.

To facilitate the opration a graphic panel 20 may be attached to an outside face of the casing C, and a lever 21 may be provided to project from the panel 20 and between a FIG. 23 showing the foaming device and a FIG. 24 showing the blower as shown in FIG. 5, the lever 21 being shiftable between a position to feed the foamed sealant into the pipeline and a position to drain the excess sealant therefrom. FIG. 5 also shows an example of connecting the piping 19a and 19b in which a flowmeter G (dot-and-dash line) has been removed from a household service pipe 1′ and the piping 19a and 19b are connected to the opening end of the downstream pipe portion.

Figure 6:
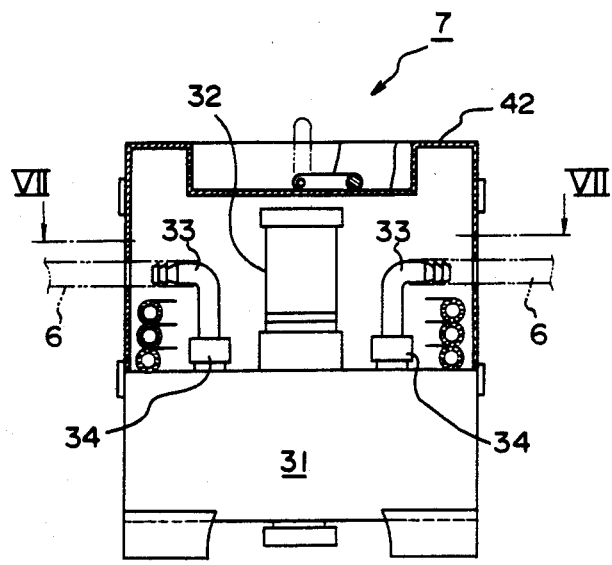
FIG. 6 is a schematic elevation of a recovery vessel for collecting discharged sealant.
Figure 7:
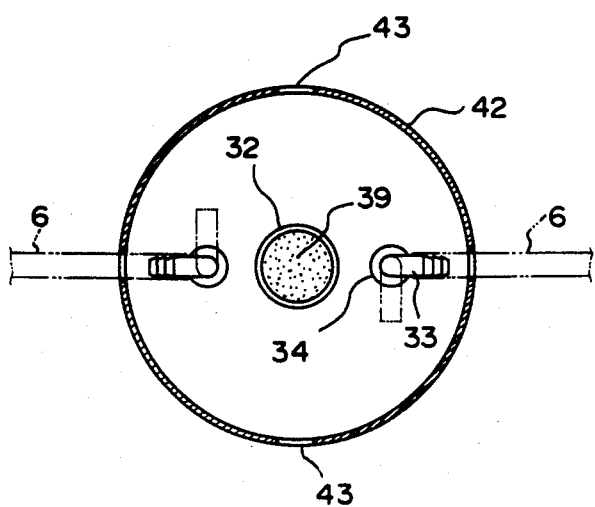
FIG. 7 is a section taken on line VII—VII of FIG. 6.

The recovery vessel 7 shown in FIGS. 6 and 7 comprises a receptacle 31, hose coupling pipes 33 attached to the receptacle 31 and having check valves 34 respectively, and a gas-liquid seperator 32 upstanding on the receptacle 31 and inside a covering case 42. The foamed sealant is delivered to the receptacle 31 from the hoses 6 connected respectively to the downstream ends of pipelines 1 under treatment (FIG. 2), and passes through a deodorant packed in the separator 32 where the foams are broken and the resulting air is deodorised and discharges through outlet pores defined in the covering case 42. The liquid resulting from the broken foams drips to the receptacle 31. The recovered liquid sealant can be used repeatedly so long as it retains required properties. Accordingly there is no likelihood at all of environmental pollution caused by the excess sealant drained from the pipeline 1.

Another embodiment of the invention is hereinafter described which uses the devices shown in FIGS. 8–10. The high rate curable sealant is first foamed up in the unit shown in FIG. 4 and is fed into the pipeline 1, an excess amount of the sealant being discharged into the recovery vessel of FIG. 6 as in the preceding embodiment. Thereafter hot air is introduced to the pipe interior by action of the blower 4 at a temperature of 60–80° C. The supply of hot air may be continued until the sealant adhering in tubular form to the interior wall of the pipeline cures almost completely or may be discontinued when the sealant is half cured.

Figure 8:
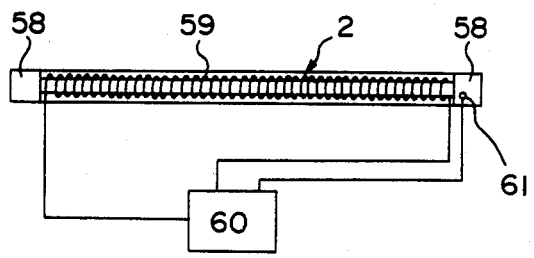
FIG. 8 is a schematic view of one type of air heating unit according to a modified embodiment of the invention.

FIG. 8 shows one type of air heating means which comprises an electric heater 59 of nichrome wire or the like mounted in the connecting tube 2 between the foamed sealant feed means and the pipeline 1 (FIG. 2), the heater 59 extending between two end joints 58. The heater 59 is connected to a power supply box 60 containing a current regulator. The joint 58 at the downstream end of the heater has a thermostat 61 connected to the power supply box 60.

Figure 9:
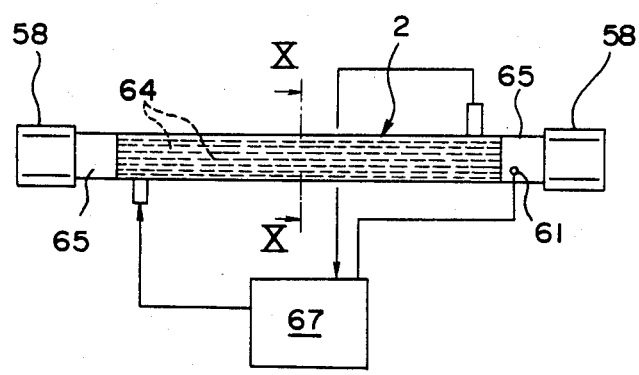
FIG. 9 is a schematic view of another type of air heating unit.
Figure 10:
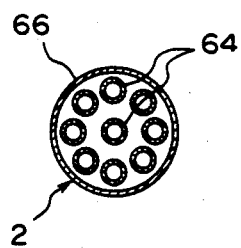
FIG. 10 is a section taken on line X—X of FIG. 9.

Instead of the electric type, the air heating means may be the heat medium circulation type, for example, as shown in FIGS. 9 and 10. This heating means comprises a plurality of parallel tubes 64 and collecting and distributing headers 65 coupled to the connecting tube 2. The plurality of tubes 64 through which the sealant and air flow are surrounded by an outer tube 66 through which a heat medium such as hot water or hot air is circulated by a circulation pump 67.

The heating means may be other types than those described above and may be disposed at a position other than the connecting tube 2.

Thus the air advancing from the blower 4 towards the pipeline 1 is heated to a suitable temperature to cause the sealant adhering in tubular form to the interior wall of the pipeline to cure quickly, whereby the total treatment time is drastically shortened.

We claim:

1. A method of internally coating the inner surface of a pipeline and filling leaking cracks from inside of the pipeline comprising the steps of:
   disconnecting the pipeline at two different locations,
   closing both ends of the pipeline,
   discharging any gases remaining in the pipeline,
   filling said closed end pipeline with a soluble emulsion type sealant in a foam state by use of inert gas or air,
   applying a predetermined pressure to the foam-filled pipeline for a predetermined period of time thereby forcing some of said sealant foam into leaking cracks,
   directing an inert gas or air flow into said foam-filled pipe to drain any excess amount of said sealant from said pipeline thereby forming a tubular form of said sealant adhering to said pipe along its inner wall surface and extending along its length, and
   allowing said tubular form adhering to the inner surface of said pipeline to cure
   wherein the sealant contains fine particles of inorganic oxide weakly adhering to one another into aggregations.

2. A method of internally coating the inner surface of a pipeline as claimed in claim 1 in which:
   subsequent to draining any excess liquid sealant from said pipeline, directing a hot air stream at a temperature of from about 30–100° C. through said pipeline to cure said sealant adhering to said inner surface of said pipeline.

3. A method of internally coating the inner surface of a pipeline as claimed in claim 2 in which:
   the inorganic oxide is selected from a group consisting of silica, alumina, silica-alumina, zeolite, titanium oxide, zinc oxide and magnesium oxide.

* * * * *